May 14, 1935.  W. C. REHM  2,001,285
ELECTRIC COOKER
Filed May 5, 1934   2 Sheets-Sheet 1

INVENTOR
William C. Rehm,
BY
ATTORNEYS

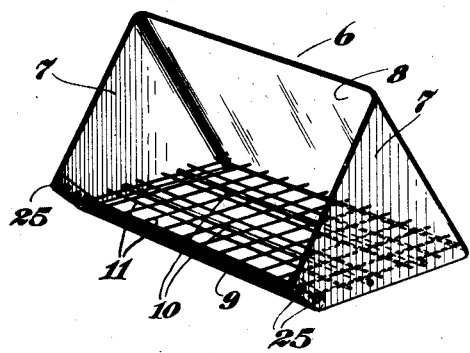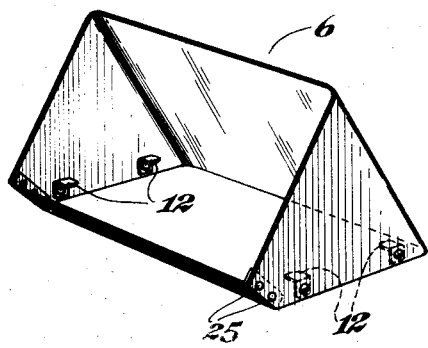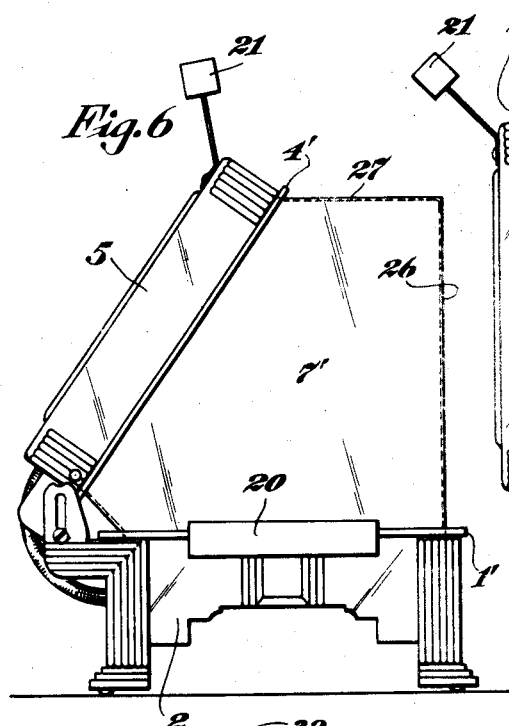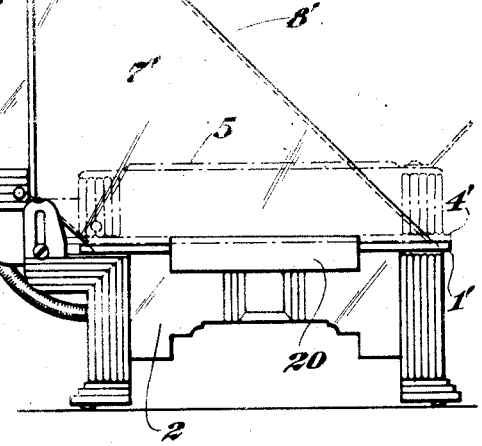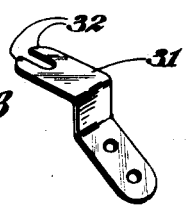

Patented May 14, 1935

2,001,285

UNITED STATES PATENT OFFICE 2,001,285

ELECTRIC COOKER

William C. Rehm, Meriden, Conn., assignor to Manning, Bowman & Co., Meriden, Conn., a corporation of Delaware Application May 5, 1934, Serial No. 724,081

17 Claims. (Cl. 219—35)

This invention relates to electric cookers.

One object of the invention is a novel electric cooker which may serve either as a conventional electric grill or as a baking oven and which may be readily converted from one type of cooker to the other type of cooker with marked facility.

A further object of the invention is a cooking unit of the character indicated comprising a readily insertable and removable oven part which when in operative position cooperatively functions with the other parts of the unit to form an electric oven which is capable of accommodating conventional easily obtainable small baking pans of various shapes and which is further characterized by its compactness, by its simplicity in construction and by the economy and efficiency of its heating and cooking operations.

A further object of the invention is a cooking unit of the character indicated comprising an oven part which is readily insertable between and removable from a pair of adjustably hinged heating plates, with the provision of both angular and spacial adjustments, and with the walls of the oven and the heating plates angularly so disposed with respect to each other as to efficiently direct the heat from the heating plates to the articles being cooked.

A further object of the invention is a cooker of the character indicated comprising an oven element of novel, simple and inexpensive construction.

For other objects of the invention and a better understanding thereof reference may be had to the accompanying drawings forming a part of this application wherein:

Fig. 4 is a perspective view of a modified oven part;

Fig. 5 is a perspective view of a further slightly modified oven part;

Fig. 6 is an end view of a modified form of cooker;

Fig. 7 is an end view of a further modification; and

Fig. 8 is a detail view of a part of Fig. 7.

Figure 1:
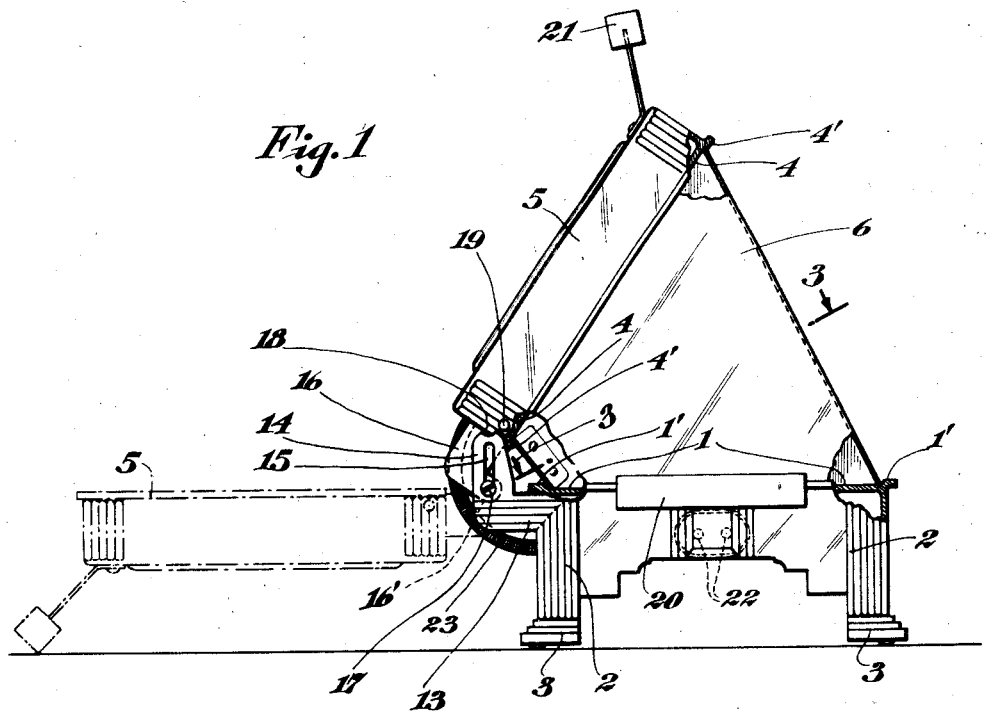
Fig. 1 is an end view partly in section of a cooker embodying the invention.
Figure 3:
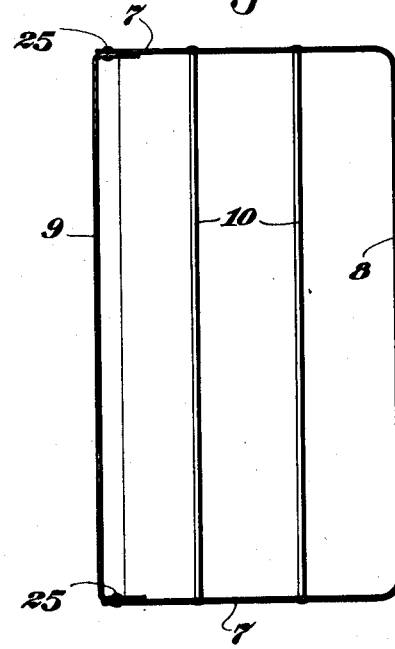
Fig. 3 is a sectional view along the line 3—3 of Fig. 1.
Figure 2:
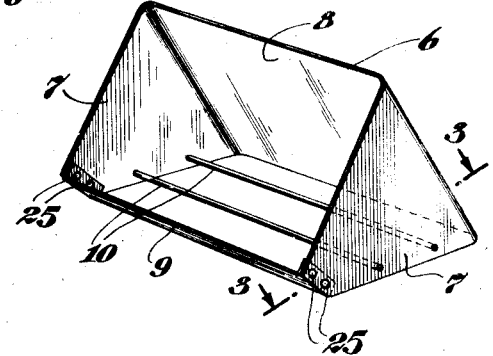
Fig. 2 is a perspective view of the oven element thereof.

Referring to Figs. 1, 2 and 3 I have illustrated my invention as embodied in a cooker comprising an electrically heated plate 1 mounted in a frame 2 having feet 3 for resting on a table or other holding surface, a second electrically heated plate 4 disposed at an acute angle to the plate 1, preferably approximately 45 degrees, and carried by a frame 5, and an oven element 6 resting upon the plate 1 and supporting the plate 4 in the angular position shown. The oven element 6 comprises parallel and similarly shaped end walls 7 and non-parallel but rectangular shaped front and back walls 8 and 9. The front wall 8 is substantially larger or higher than the back wall 9, and the end walls 7 are irregularly shaped to correspond to the front and back walls, thus forming planar perimeters about the two open sides of the oven element with the planes thereof disposed at an acute angle to each other. The oven element 6 thus has an open side adjacent the heating plate 1 and another open side adjacent the heating plate 4 with the front wall 8 disposed at an acute angle to both the plates 1 and 4, while the rear side wall 9 forms an obtuse angle with the plate 1 and substantially a right angle or slightly greater than a right angle with the plate 4 and the end walls 7 form substantially right angles with the plates. In the particular embodiment shown the side wall 8 occupies approximately a 45 degree angle with respect to the plates 1 and 4. The heating plate 1 is provided with a border shoulder 1' and the heating plate 4 is provided with a border shoulder 4', thereby forming pan or dish effects, and as indicated in the drawings and in the preferred construction the bottom edges of the walls 7, 8 and 9 form an opening co-extensive with the plate 1, while the upper edges of these walls form an opening co-extensive with the plate 4, the element 6 resting upon the plate 1 and forming a closure therewith and the frame 5 resting by gravity upon the element 6 with the plate 4 exposed to the opening therein. The inside edges of the shoulders 1' and 4' form means for retaining the parts in assembled relation, the oven element engaging said shoulders and holding itself in position on the plate 1 and retaining the other plate 4 in operative position. The heating plates 1 and 4 carried respectively by the frame parts 2 and 5 are hingedly and adjustably fastened together to form one part of the cooking element, both pivotal and spacial adjustments being provided. For this purpose the frame 2 is provided with a pair of rearwardly extending brackets 13 having disposed at right angles thereto lugs or ears 14. The lugs 14 are provided with elongated slots 15 also disposed, in the particular embodiment shown, at right angles to the brackets 13 and the heating plate 1. The frame part 5 carrying the heating plate 4 is provided with a pair of rearwardly extending extensions or lugs 16, these also being disposed adjacent the ends of the frame 5 which extensions or lugs are also provided with right angular portions 16', these angularly disposed portions 16' carrying retaining elements 17 projecting through and adapted to traverse the slots 15 formed in the members 14. In the particular embodiment shown these retaining elements 17 are screws which are screw-threadedly attached to the members or ears 16' with their heads forming stops on one side to limit the lateral relative movement of the frame parts 2 and 5. The lugs 14 are provided with notches 18 for the reception of retaining pins 19 carried by the end walls of the frame part 5; by this means the frame part 5 with the heating plate 4 may be supported independently of and out of contact with the oven element 6, the part 5 resting by gravity upon the lugs 14. The hinge adjustment thus provides for both angular and spacial adjustments of the heating plates 1 and 4 whereby the frame 5 with its plate 4 may be supported by gravity upon and accurately fitted to the oven element 6 independently of the hinge and regardless of the height of or inaccuracies in the oven element within the range of adjustment provided by the pin slot 17, 15. If desired, adjustment may be provided also at an angle to the slot 15, but ordinarily the arrangement shown gives sufficient flexibility. The angular relation of the plates 1 and 4 and the principal side walls (7 and 8) of the element 6 helps materially in radiating reflecting and directing the heat from the aluminum grids toward the article or articles being warmed, baked or cooked with maximum temperature attained because of the minimum cubical content or volume and with best economy and efficiency.

The oven element 6 is adapted to contain the cooking or baking pans (omitted for convenience in illustration), these pans being of various shapes obtainable on the market, as for example pans for baking biscuits, muffins, apples, potatoes, small cakes, meat loaves, and the like. Preferably the bottoms of such pans should be supported from out of actual contact with the plate 1. This may be effected in a number of ways. For example, the pans or cooking utensils themselves may be provided with legs to raise the bottoms from out of contact with the heating surface 1 or as shown in Figs. 2 and 3 the oven element 6 may be provided with wires or a frame built inside to form a part thereof, as for example the wires 10 which extend lengthwise of the element and are supported in apertures in the end walls 7. These wires or rods 10 may be simply inserted in these openings and then peaned over at their ends to hold them in place. The pan or utensil may simply rest upon these wires or rods 10 which are disposed, as indicated, adjacent the heating plate 1.

In Fig. 4 a modified arrangement of support for the pans is shown according to which a separate open frame or grill 11 is simply positioned upon the heating plate 1 inside the oven element 6 for supporting the cooking pans or utensils away from contact with the bottom cooking surface.

In Fig. 5 a further modified means of pan support is shown comprising lugs or ears 12 riveted to the end walls 7 of the element 6, these lugs or ears being adapted to support a grill or cooking pan from out of contact with the heating plate 1.

The frame part 2 may be provided with any suitable handle means, as for example a pair of handles 20 fastened in any suitable manner to the ends thereof. The frame part 5 is provided with a suitable handle 21 for lifting the same to any of its several positions. I have indicated at 22 an electrical plug for supplying power to the device and at 23 a flexible connection between the relatively adjustable frame parts 2 and 5 for assuring the supply of current thereto regardless of the relative positions thereof. For convenience in illustration I have omitted any outlet or drain for drippings which may be contained upon or fall upon the heating plate 1, but where desired such outlet or drain is provided.

In operation the cooking pan, grid or other cooking utensil is inserted within the oven 6 down upon or adjacent to the heating plate 1 with the article to be warmed or cooked therein. This may be readily done by moving the part 5 about the lugs 14, 16' as a hinge and away from the oven element 6, as for example into the dash and dot line position indicated in Fig. 1. After the insertion of the cooking utensil with the article to be warmed or cooked therein the part 5 may be adjusted back into the full line position indicated in Fig. 1 where it rests upon the open side of the oven element 6 and is firmly held there by gravity and by the engagement with the shoulder 4'. By turning on the power for the required time the article may be readily cooked. The particular angular relation of the heating plates 1 and 4 with respect to each other and with respect to the walls 7, 8 and 9 of the oven element as shown in Fig. 1 is of particular advantage from the standpoint of economy and efficiency in the heating and cooking operation in that the particular angular position shown assists materially in radiating and deflecting the heat from the heating plates (aluminum grids) 1 and 4 toward the article or articles of food being warmed, baked or cooked. The oven is adapted also to contain the conventional easily obtainable small cooking and baking pans or grills of various shapes and the angular position shown results in the maximum temperature for minimum cubical content or volume with a given consumption of power. Another advantage is that when it is desired the oven element may be removed and the remainder of the cooker used as a conventional grill or cooker. For this purpose the part 5 may be turned over to the dash dot line position indicated in Fig. 1 or through 180° from the frame part 2 to form a double grill or frying pan, both open at the top, or the frame part 5 may be turned to a position superposed above the part 2 to form both upper and lower heat radiating surfaces for cooking the various articles of food for which such conventional use is adapted. The hinge pin slot arrangement 15, 17 between the frame parts 2 and 5 affords a limited range of spacing of the heating plates 1 and 4 for superposed cooking operations. By the use of my cooker, therefore, I may in addition to the oven cooking and baking operations outlined above effect the cooking operations of the conventional cooker, and all of these cooking operations are possible notwithstanding the simplicity and compactness of the small unit.

In the particular embodiment shown in Figs. 1 to 5 the oven element 6 is indicated as made of sheet metal, the walls 7 and 8 being made of one piece and the wall 9 of another piece, the two pieces being formed as indicated and fastened together by rivets as indicated at 25. It may be made of steel, brass, copper, aluminum, etc. It may or may not be lined with insulation as may be desired. I have shown the oven element as being of rigid construction but it may be collapsible, as for example by making it of two or more parts and hinging them together.

In Fig. 6 I have shown a modified form of oven element, this element having the two open sides similar to the two open sides of the element 6 described above for exposure to the heating plates 1 and 2. This oven element differs from the element 6 of Fig. 1 in that the front wall 8' is continued upwardly at right angles to the plate 1 to a point on a level with the upper edge of the inclined heating plate 4 and then turned at right angles to itself to meet the upper edge of the plate 4, these two parts of the wall being designated 26 and 27 respectively. Each of the end walls 7' now forms a five-sided figure instead of the four-sided figure of Fig. 1. The wall 8' (26) is disposed at an acute angle to the heating plate 4. This has certain advantages over the construction of Fig. 1 in that it accommodates certain cooking utensils or pans which would not be accommodated in the modification of Fig. 1.

In Fig. 7 I have shown a still further modification of the unit according to which the frame 5 of the cooker is now disposed in substantially a vertical or right angular position with respect to the frame 2 with corresponding right angular positions of the heating plates 1 and 4, while the front wall 8' of the oven element makes smaller acute angles with the heating plates 1 and 4 and the end walls 7' have their lower and inner edges disposed at right angles to each other corresponding to the different construction shown. Any suitable means may be provided for clamping the cooker part 5 to the open side of the oven element of Fig. 7, such for example as the clamping means indicated, comprising a stud 29 and adjustable nut 30 carried by the frame 5 and the finger 31 fastened to the front wall 8' and having a fork 32 for receiving the stud 29. The frame 5 still rests by gravity upon the oven element 6, the latter engaging the shoulder 4' at the top, but the clamping means avoids accidental backward tilting of the frame 5. The hinge slot adjustment compensates for inaccuracies in manufacture and moreover provides a considerable range of adjustment for different heights of oven element as described above.

I claim:

1. In an electric cooker an oven element comprising front and back walls of rectangular shape but of different heights and a pair of similar parallel end walls joined to the front and back walls, said walls terminating in planar peripheral edges which define heat exposure openings with the planes thereof at an angle to each other, and a pair of heating plates adjustably fastened to each other for both angular and spacial adjustment, one of said plates engaging the lower peripheral edge for exposure to the lower opening and supporting said oven element and the other of said plates engaging the other peripheral edge of said oven element for exposure to the other opening, the angular and spacial adjustments permitting accurate closure of said openings by said plates and the front wall being disposed at an acute angle to at least one of said plates.

2. In an electric cooker an oven element having two heat exposure openings defined by planar peripheral edges, the planes thereof being disposed at an angle to each other and a pair of heating plates which are adjustably hinged at one edge to each other for both angular and spacial adjustments and which house said oven element with one of the heating plates engaging the peripheral edges of one of the open sides of the oven element and the other of said heating plates engaging the peripheral edges of the other open side of the oven element and means whereby the plates and the oven element are retained in closed heating relation.

3. An electric cooker comprising a pair of heating plates adjustably fastened together and disposed at an acute angle to each other and an oven element housed within the space between said plates and having two heat exposure openings whose peripheral edges define planes at an acute angle corresponding to the acute angle of said plates, said element resting upon one of said plates with an opening exposed thereto and with the other plate resting by gravity upon the oven element and exposed to the other opening.

4. In a cooker of the character set forth in claim 1 wherein the heating plates are surrounded by shoulders and the adjustable fastening means permit the edges of the exposure openings of said oven element to come within said shoulders.

5. In a cooker of the character set forth in claim 1 wherein the oven element rests by gravity upon one of the heating plates and the other of said heating plates rests by gravity upon the oven element.

6. In a cooker of the character set forth in claim 1 wherein the heating plates are disposed at an acute angle to each other with the oven element resting by gravity upon one of the heating plates and the other of the heating plates resting by gravity on the oven element.

7. In a cooker of the character set forth in claim 3 wherein the front wall of the oven element forms a plane deflecting surface at approximately 45° to the plates.

8. In a cooker of the character set forth in claim 1 wherein the front wall of the oven member is formed of two parts disposed at an angle to each other.

9. In an electric cooker of the character set forth in claim 1 wherein the oven element comprises means for supporting a pan or other cooking utensil out of contact with the lower heating plate.

10. In an electric cooker a pair of heating plates adjustably hinged to each other and disposed at an angle to each other and an oven element housed within but readily insertable and removable from said angularly disposed plates, said oven element having an open side adjacent and exposed to one of said plates and another side adjacent and exposed to the other of said plates.

11. In a cooker of the character set forth in claim 10 wherein the heating plates are disposed substantially at right angles to each other with the oven element having the planes of its open sides similarly angularly disposed.

12. In a cooker of the character set forth in claim 10 wherein the heating plates are disposed substantially at a right angle to each other with the oven element having the planes of its open sides similarly angularly disposed, with the front wall of said oven element forming a plane surface.

13. In an electric cooker an oven element having two heat exposure sides whose peripheral edges define planes at an angle to each other and adapted to be housed within and inserted between two similarly angularly disposed heating plates of an electric heater with the walls thereof reflecting the heat from the plates to the article being cooked.

14. In an electric cooker of the character set forth in claim 2 wherein the heating plates are hinged together for adjustment through a range of 180° with the hinge comprising means whereby the hinged edges of the plates may be adjusted to different distances from each other.

15. In a cooker of the character set forth in claim 2 wherein the oven element embodies cross supporting rods adjacent the peripheral edge of the lower opening for supporting a cooking utensil out of contact with the adjacent heating plate.

16. In a cooker of the character set forth in claim 2 wherein the oven element embodies lugs on the inside walls thereof adjacent the peripheral edge of an opening for supporting a cooking utensil out of contact with the corresponding adjustable heating plate.

17. A cooker of the character set forth in claim 2 embodying a grill disposed within the peripheral edge of an opening of the oven and resting upon the lower of said heating plates.

WILLIAM C. REHM.